No. 770,110. PATENTED SEPT. 13, 1904.
J. M. RECTOR & W. H. ROSBURY.
KNOTTER GEARING.
APPLICATION FILED JULY 6, 1903.
NO MODEL.
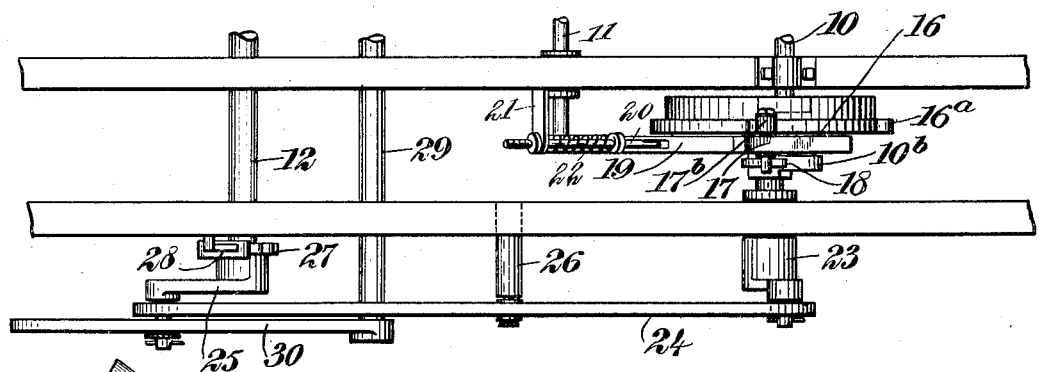
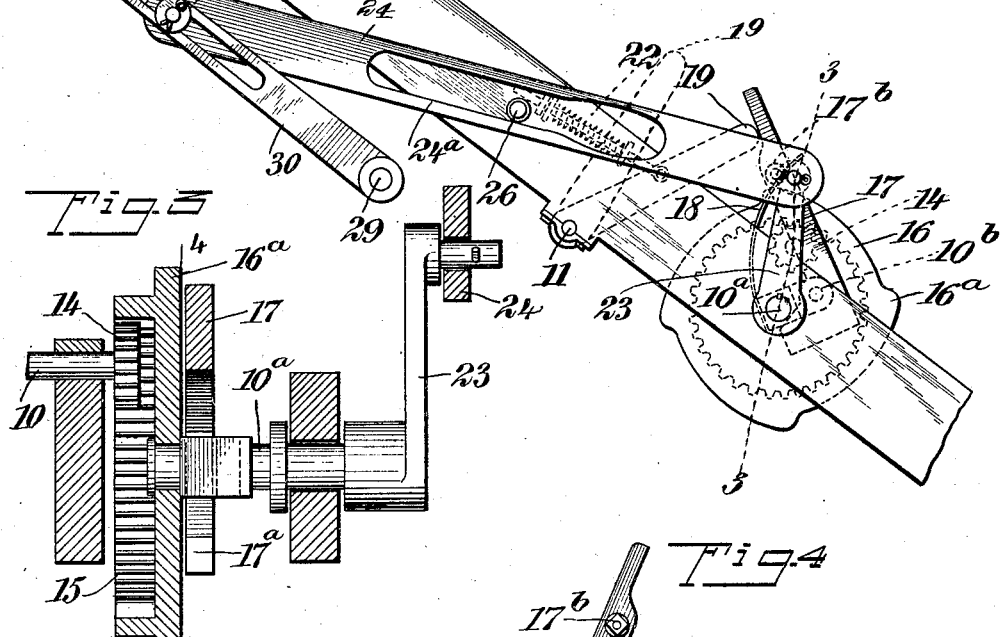
WITNESSES:
J. A. Brophy
Isaac R. Owens.
INVENTORS
William H. Rosbury
James M. Rector
BY
Munn & Co.
ATTORNEYS No. 770,110.  Patented September 13, 1904.

UNITED STATES PATENT OFFICE.

JAMES M. RECTOR AND WILLIAM H. ROSBURY, OF MONARCH, MONTANA.

KNOTTER-GEARING.

SPECIFICATION forming part of Letters Patent No. 770,110, dated September 13, 1904.

Application filed July 6, 1903. Serial No. 164,347. (No model.)

*To all whom it may concern:*

Be it known that we, JAMES M. RECTOR and WILLIAM H. ROSBURY, both citizens of the United States, and residents of Monarch, in the county of Cascade and State of Montana, have invented a new and Improved Knotter-Gearing, of which the following is a full, clear, and exact description.

This invention relates to gearing for driving the knotter-shaft of a self-binding grain-harvester.

The object is, primarily, to dispense with the toothed gearing ordinarily employed for connecting the drive-shaft with the knotter-shaft and to provide a superior means for transmitting the movement through the medium of crank-arms and a link connecting them. This end we attain by dividing the drive-shaft and connecting the sections by a peculiarly-constructed clutch controlled by a stop on the trip-shaft and providing the drive-shaft and knotter-shaft each with a crank connected by a link longitudinally slotted and receiving in said slot a guide, which is stationary on the frame and which at certain periods converts the link into a lever, enabling the gearing readily to pass the dead-center points.

This specification is an exact description of one example of our invention, while the claims define the actual scope thereof.

Reference is to be had to the accompanying drawings, forming a part of this specification, in which similar characters of reference indicate corresponding parts in all the views.

Figure 1 is a plan view of the mechanism. Fig. 2 is an outer side elevation. Fig. 3 is a section on the line 3 3 of Fig. 2, and Fig. 4 is a detail elevation with parts in section on the line 4 4 of Fig. 3 of the dog which forms part of the clutch.

The framing may be of the usual or any desired sort and will not be specifically referred to.

10 indicates the drift-shaft, with which the packer-arms are connected as usual.

11 indicates the trip-shaft, which carries the trip-arm against which the gavel is built, this arm operating in the usual manner under the action of the gavel-pressure.

12 indicates the knotter-shaft, with which the knotting mechanism, which may be of any approved sort, is connected, and 29 indicates the needle-shaft.

As shown best in Fig. 3, the drive-shaft 10 is provided with a fixed pinion 14, meshed with an internal gear-ring 15, formed on a clutch-wheel 16, which is mounted to turn loosely on the clutch-shaft $10^a$. Said clutch-shaft $10^a$ has a laterally-offset portion $10^b$, (best shown in Fig. 4,) and on this offset portion is mounted by a pivot 15 the dog 17, said dog having a laterally-turned shank $17^a$, limiting by engagement with the clutch-shaft $10^a$ the movement of the dog to inactive position. The dog 17 lies alongside of the clutch-wheel 16, as shown in Fig. 3, and said dog has a lateral roller $17^b$ overhanging the periphery of the clutch-wheel and coacting with the cam-faces $16^a$, formed on said periphery. 18 indicates a spring, which is attached to the clutch-shaft $10^a$ and bears against the extended axle of the roller $17^b$, this spring tending to throw the dog 17 downward with its roller $17^b$ into engagement with the periphery of the clutch-wheel 16. The shaft 10 being driven continuously will impart a similar movement to the parts 15 and 16, which turn idly on the clutch-shaft $10^a$. The dog 17, by the action of the spring 18, is normally engaged with the clutch-wheel 16, and through the engagement of the parts $16^a$ and $17^b$ the clutch-shaft $10^a$ is caused to turn in unison with the shaft 10. When, however, the dog 17 is thrown outward against the action of the spring 18, so as to disengage the roller $17^b$ from the clutch-wheel 16, said disk turns without imparting its movement to the parts 17 and $10^a$. For normally holding the dog 17 in said inactive position we provide a stop 19, which is fastened to the trip-shaft 11 and lies normally in the position shown in Figs. 1 and 2. 20 indicates a rod attached to the stop 19 and sliding freely in a guide 21, rigid with the framing. Around this rod 20 is a spring 22, which holds the dog yieldingly in its active position. When, however, the weight of the gavel bearing against the trip-arm is such as to overcome the pressure of the spring 22, the stop 19 moves upward into the position shown by the dotted lines in Fig. 2, and then the spring 18 is free to throw the dog 17 downward to engage the disk 16, whereupon the parts 16, 17, and 10ª turn as a unit driven by the part 10. This movement is continued until the stop 19 is thrown back into the path of the dog 17, and then the dog is moved into inactive position and the rotation of the shaft 10ª ceases. On the outer end of the clutch-shaft 10ª is fastened a crank 23. Said crank has a link 24 pivoted thereto, and this link extends upward to similar engagement with a crank 25, fastened on the knotter-shaft 12. The link 24 is formed with a longitudinal slot 24ª intermediate its ends, and in this slot bears a fulcrum-pin 26, fastened to the frame. The rotation of the shaft 10ª imparts a corresponding movement to the shaft 12, and when the cranks reach the dead-center positions the link 24 is converted into a lever rocking momentarily around the fulcrum 26, and thus the passing of the dead-center is assured. The shaft 12 is provided with a ratchet 27, this ratchet coacting with a spring-pawl 28 on the frame and said parts preventing retrograde movement of the shaft 12 and also holding said shaft and the connected parts in the position in which said parts are left upon the instant the dog 17 disengages the wheel 16. Therefore as soon as the stop 19 is moved into inactive position and the dog 17 drops into active position the shaft 12 will be moved on from the exact starting position of the knotter.

In the operation of the apparatus the continual movement of the shaft 10 and the packers connected thereto results in the formation of the gavel on the binder-table, and when the pressure of the gavel becomes great enough the shaft 11 is rocked to throw upward the stop 19, whereupon the dog 17 falls into active position and the clutch-shaft 10ª is rotated. The needle then moves to pass the thread around the gavel, and the shaft 12 is operated to tie the knot, after which the completed sheaf is ejected, and then the stop 19 returns to the position shown in Fig. 2. The needle and knotter mechanism are then at rest and the formation of the second gavel begins.

The needle-shaft 29 has a slotted arm 30 connected thereto and to the crank 25, whereby the needle-shaft is driven in proper synchronism with the other elements.

Various changes in the form, proportions, and minor details of our invention may be resorted to at will without departing from the spirit and scope thereof. Hence we consider ourselves entitled to all such variations as may lie within the intent of our claims.

Having thus described our invention, we claim as new and desire to secure by Letters Patent—

1. The combination of a drive-shaft, a knotter-shaft, a crank on the knotter-shaft, a link connected to the crank, a second crank connected to the link, a clutch joining the second crank and drive-shaft, means for operating the clutch, the said link having a longitudinally-disposed slot therein intermediate the ends of the link, and a stationary member fitted loosely in the slot, for the purpose specified.

2. In a self-binder, the combination of the drive-shaft, a clutch-shaft in connection with the knotter, a dog in connection with the clutch-shaft, a clutch-wheel with which the dog is normally engaged, said wheel being mounted loosely on the clutch-shaft and having an internal gear-ring, a gear on the drive-shaft and meshed with the internal gear of the wheel, and means for periodically moving the dog out of engagement with the wheel.

3. In a self-binder, the combination of a drive-shaft, a clutch-shaft in connection with the knotter, a dog on the clutch-shaft, a loosely-mounted clutch-wheel on the clutch-shaft, a means pressing the dog normally into engagement with the wheel, an internal gear-ring on the wheel, a gear on the drive-shaft and meshed with the internal gear-ring, and means for periodically moving the dog out of engagement with the wheel.

4. In a self-binder, the combination of a drive-shaft, a clutch-shaft in connection with the knotter, a dog on the clutch-shaft, a clutch-wheel loosely mounted on the clutch-shaft, means pressing the dog yieldingly into engagement with the wheel, a gear on the wheel, a gear on the drive-shaft and meshed with the gear on the wheel, and means for periodically moving the dog out of engagement with the wheel.

5. In a self-binder, the combination of a drive-shaft, a normally engaged clutch mechanism for the purpose specified, means for periodically disengaging said clutch, a crank in connection with the clutch, a link connected to the crank, a knotter-shaft, a crank on the knotter-shaft and connected with the link, said link having a longitudinal slot therein intermediate its ends, and a stationary member bearing loosely in the slot.

6. The combination of a drive-shaft, a knotter-shaft, a crank on the knotter-shaft, a link connected to the crank, a second crank connected to the link, a clutch joining the second crank and drive-shaft, means for operating the clutch, a needle-shaft, and a crank on the needle-shaft, the crank on the needle-shaft having sliding connection with the crank of the knotter-shaft.

7. The combination of a drive-shaft, a knotter-shaft, a crank on the knotter-shaft, a link connected to the crank, a second crank connected to the link, a clutch joining the second crank and drive-shaft, means for operating the clutch, a needle-shaft, and a crank on the needle-shaft, the crank on the needle-shaft having connection with the crank of the knotter-shaft, said connection consisting of a pin on the knotter-crank and a slot in the needle-crank in which slot said pin is loosely received.

8. In a self-binder, the combination of a sectional drive-shaft, a gear fast thereto, a clutch-shaft, a clutch-wheel loose thereon, a gear on the wheel and meshed with the first-named gear, a dog pivoted on the clutch-shaft and having a part coacting with the periphery of the wheel, means yieldingly pressing the dog into engagement with the wheel, means acting periodically to move the dog out of engagement with the wheel, a crank on the clutch-shaft, a link connected to the crank, a knotter-shaft, a crank thereon to which crank the link is connected, a needle-shaft, and a crank on the needle-shaft, the last-named crank having driving connection with the crank on the knotter-shaft.

9. The combination of a drive-shaft, an automatic clutch, a crank driven through the clutch, a knotter-shaft, a needle-shaft, a crank on the knotter-shaft, a link driven from the first crank and connected to the knotter-crank, and a crank on the needle-shaft, the crank on the needle-shaft having sliding connection with one of the parts driven from the clutch-crank.

10. The combination of a drive-shaft, an automatic clutch, a crank driven through the clutch, a link connected to the crank, a knotter-shaft, a crank on the knotter-shaft having connection with the link, a needle-shaft, and a crank on the needle-shaft having sliding connection with the wrist-pin of the crank on the knotter-shaft.

11. The combination of a drive-shaft, an automatic clutch connected therewith, a crank driven through the clutch, a knotter-shaft, a needle-shaft, a crank on the knotter-shaft, a link driven from the clutch-crank and having connection with the knotter-crank, and a crank on the needle-shaft having sliding connection with one of the two last-named elements, to be driven therefrom.

In testimony whereof we have signed our names to this specification in the presence of two subscribing witnesses.

JAMES M. RECTOR.
    WILLIAM H. ROSBURY.

Witnesses:
 JAMES BROZEL,
 ED. D. DIBBLE.